United States Patent [19]
Anstey et al.

[11] Patent Number: 4,697,402
[45] Date of Patent: Oct. 6, 1987

[54] MECHANISM FOR FEEDING WRAP MATERIAL INTO A BALE-FORMING CHAMBER FOR ENVELOPING A LARGE ROUND TABLE

[75] Inventors: Henry D. Anstey; Roger W. Frimml, both of Ottumwa, Iowa; Josef Frerich, Dietrichingen, Fed. Rep. of Germany

[73] Assignee: Deere & Company, Moline, Ill.

[21] Appl. No.: 883,794

[22] Filed: Jul. 8, 1986

[51] Int. Cl.⁴ ............................................. B65B 57/04
[52] U.S. Cl. ......................................... 53/506; 53/508; 53/587; 53/389
[58] Field of Search .................... 53/64, 118, 506, 508, 53/556, 587, 389; 100/5, 80; 56/341

[56] References Cited

U.S. PATENT DOCUMENTS

| | | | |
|---|---|---|---|
| 4,224,777 | 9/1980 | Miyazaki | 53/508 X |
| 4,458,467 | 7/1984 | Shulman | 53/556 |
| 4,597,241 | 7/1986 | Clostermeyer | . |
| 4,625,362 | 12/1986 | Kollross | 53/506 |

FOREIGN PATENT DOCUMENTS

| | | | |
|---|---|---|---|
| 3418681 | 11/1985 | Fed. Rep. of Germany | 100/88 |
| 2137927 | 10/1984 | United Kingdom | 100/5 |
| 2145659 | 4/1985 | United Kingdom | 100/88 |
| 2146288 | 4/1985 | United Kingdom | . |

OTHER PUBLICATIONS

Power Farming Magazine "Round Baler Review", Mar. 1986.

*Primary Examiner*—John Sipos

[57] ABSTRACT

A drive roll drive of a wrap material feed mechanism is driven at a peripheral speed a desired percentage slower than the peripheral speed of a bale being wrapped whereby the drive rolls function also in the manner of a drag brake so that the wrap material is applied under tension to the bale being wrapped. A spreader roll is located between a supply roll of wrap material and one of the drive rolls and is so positioned relative thereto that the wrap material engages a substantial portion of the perimeter of the drive roll, such engagement diminishing the tendency of the tensioned wrap material to slip through the drive rolls. In an alternate embodiment, a wrap material monitoring device in the form of a spreader roll rotation sensing device is provided for signalling an operator both of the depletion of the supply of wrap material and of the unwanted dispensing of wrap material.

3 Claims, 6 Drawing Figures

MECHANISM FOR FEEDING WRAP MATERIAL INTO A BALE-FORMING CHAMBER FOR ENVELOPING A LARGE ROUND TABLE

RELATED APPLICATIONS

On a date even with the filing date of the instant application, the following commonly assigned applications were filed for covering inventions at least partially disclosed in this pplication:

1. Application Ser. No. 883,791 filed in the name of Verhulst et al and entitled SYSTEM FOR AUTOMATICALLY ENVELOPING A LARGE ROUND BALE WITH A WRAPPING.
2. Application Ser. No. 883,196 filed in the names of Frimml et al and entitled WRAP MATERIAL STRIPPER AND GUIDE ASSEMBLY.
3. Application Ser. No. 883,793 filed in the name of Frerich and entitled HOUSING FOR HOLDING A SUPPLY ROLL OF LARGE ROUND BALE WRAP MATERIAL.
4. Application Ser. No. 883,239 filed in the names of Verhulst et al and entitled ASSEMBLY FOR GUIDING WRAP MATERIAL FROM THE REAR OF A BALER TO A BALE-FORMING CHAMBER INLET.

BACKGROUND OF THE INVENTION

The present invention relates to large round balers and more particularly relates to apparatus for feeding wrap material to the bale chamber for enveloping a bale located therein.

It is known to provide large round balers with apparatus for wrapping a large round bale with wrap material having a width commensurate with that of the bale-forming chamber.

It is common for the wrapping apparatus to include a rotatable support for holding a roll of wrap material adjacent the bale-forming chamber and to provide a mechanism for feeding wrap material from the roll into the bale-forming chamber. These feed mechanisms usually include a pair of wrap material drive rolls mounted for frictionally gripping wrap material therebetween and being selectively drivable for feeding wrap material into the bale-forming chamber when it is desired to wrap a bale. It is desirable to have the wrap material held tight while the bale is being wrapped and for this purpose it is known to provide a drag brake engaged with the rotatable support for the roll of wrap material. U.S. Pat. No. 4,366,665 granted to VanGinhoven et al on Jan. 4, 1983 discloses such a drag brake.

SUMMARY OF THE INVENTION

According to the present invention there is provided an improved wrap material feed mechanism which maintains the wrap material taut during wrapping of a bale.

An object of the invention is to provide a wrap material feed mechanism for keeping wrap material under tension, during wrapping of a large round bale, without using a drag brake.

More specifically, it is an object of the invention to drive the drive rolls of a wrap material feed mechanism such that their peripheral speed is a predetermined percentage slower than the linear speed of the periphery of a bale being wrapped in the bale-forming chamber whereby wrap material engaged with the bale periphery will be tensioned or stretched by approximately such percentage.

Another object of the invention is to provide a wrap material feed mechanism including a wrap material support roll mounted in such relationship to a pair of drive rolls that it causes the wrap material to engage a substantial portion of the periphery of one of the drive rolls.

Yet another object is to optionally equip the wrap material support roll of the previous object with a rotation sensor for indicating both the depletion of and the undesired dispensing of the wrap material supply.

These and other objects will become apparent from a reading of the ensuing description together with the appended drawings.

DESCRIPTION OF THE PREFERRED EMBODIMENT

Initially, it is to be noted that various components are described as existing in pairs while only one of each pair is shown and it is to be understood that the unshown component is the same or similar in construction to the one shown.

Figure 1:
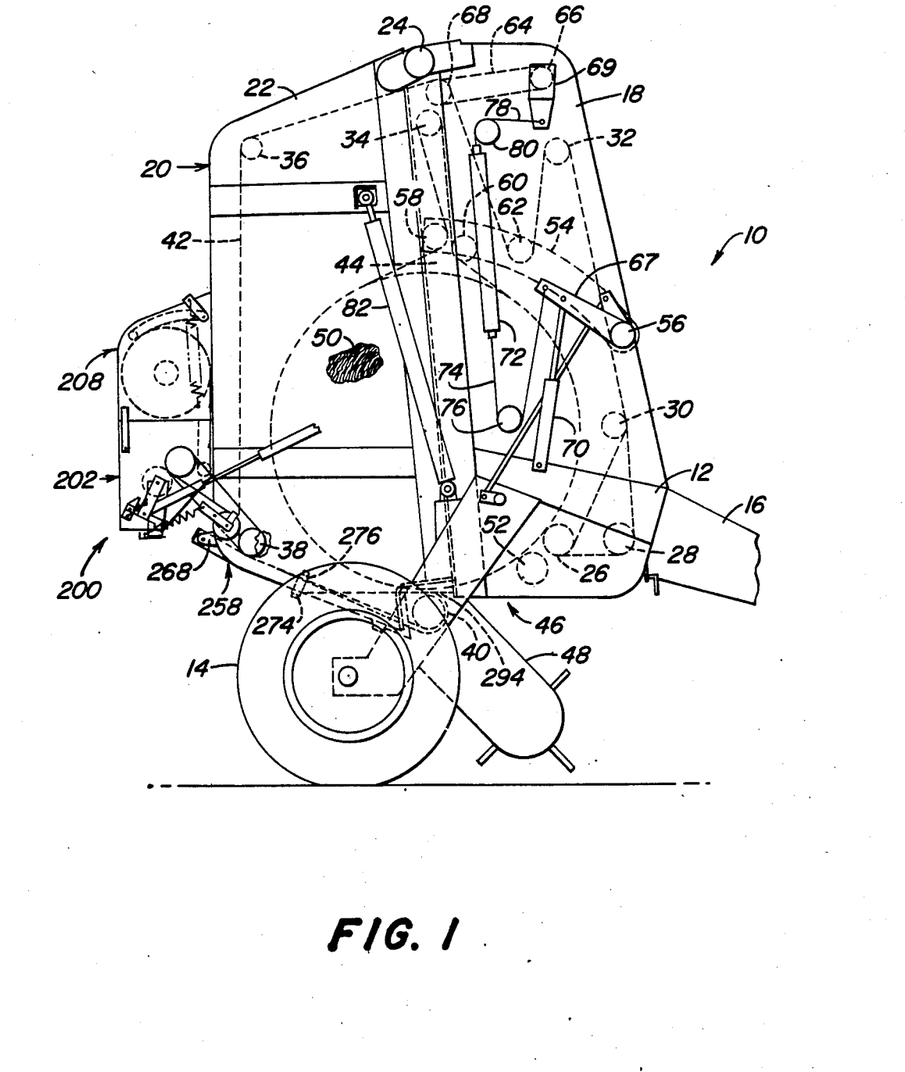
FIG. 1 is a right side elevational view of a large round baler having a wrapping mechanism constructed in accordance with the present invention and being shown in a wrap-dispensing condition.

Referring now to FIG. 1, there is shown a large round baler 10 including a main frame 12 supported on a pair of ground wheels 14 and having a draft tongue 16 secured thereto and adapted for connection to a tractor. A pair of transversely spaced vertical sidewalls 18 is joined to the frame 12 and has respective upright rear ends. A bale discharge gate 20 including opposite sidewalls 22 is vertically pivotally attached, as at 24, to upper rear locations of the sidewalls 18, the sidewalls 22 having forward ends which mate against the rearward ends of the sidewalls 18 when the gate 20 is in a lowered, closed position, as shown.

The pairs of sidewalls 18 and 22 rotatably support the opposite ends of plurality of bale-forming belt support rolls adjacent the periphery of the sidewalls. Specifically, beginning at a lower central location of the sidewalls 18 and proceeding counterclockwise there are mounted a driven roll 26, a lower front roll 28, an intermediate front roll 30, an upper front roll 32 and an upper rear roll 34; and continuing counterclockwise from an upper rear location of the gate sidewalls 22 there is mounted an upper rear roll 36, a lower rear roll 38 and lower front roll 40. A plurality of endless bale-forming belts 42 are spaced one from the other across the space between the opposite pairs of sidewalls 18 and 22. Except for some of the belts 42 which skip the lower front roll 28 the belts are trained so that they serially engage the rolls 26, 28, 30, 32, 36, 38, 40 and 34. The belts 42 cooperate with the sidewalls 18 and 22 to define a bale-forming chamber 44 having an inlet 46 located between the rolls 40 and 26 and into which crop products are introduced by a pickup 48 for being rolled into a bale 50 by the action of the belts 42 and initially also by a starter roll 52 rotatably mounted in the sidewalls 18 adjacent the driven roll 26. As the bale 50 is being formed, the chamber 44 yieldably expands against the force established in the belts 42 by a tensioning system including a pair of tensioning arms 54 vertically pivotally mounted, as at 56, to a central front location of the sidewalls 18 and carrying a pair of closely spaced rolls 58 and 60 between which are located respective runs of the belts 42 extending between the roll 34 and the rolls 40 and 26 whereby the rolls 58 and 60 close the top of the bale-forming chamber 44. Another roll 62 is carried by the arms 54 and engages the upper side of a run of the belts 42 extending between the rolls 32 and 36. A further pair of belt tensioning arms 64 is vertically pivotally mounted, as at 66, to an upper front location of the sidewalls 18 and carry a roll 68 engaged with the underside of the run of the belts 42 extending between the rolls 32 and 36. The pairs of arms 54 and 64 are located just interiorly of the sidewalls 18. Respectively coupled for rotation with the pairs of arms 54 and 64 and located exteriorly of the sidewalls 18 are pairs of arms 67 ano 69. Coupled to the arms 67 for yieldably resisting clockwise movement of the arms 54 is a pair of hydraulic cylinders 70, which are anchored to the frame 12, and a pair of springs 72 having lower ends coupled to the arms 67, by means of chains 74 extending under guide sprockets 76 mounted to the sidewalls 18, and having upper ends coupled to the pairs of arms 69 by means of chains 78 extending over guide sprockets 80 mounted to the sidewalls 18. A pair of gate cylinders 82 is coupled between the frame 12 and the gate 20 for swinging the latter vertically from its illustrated closed position to discharge the bale 50 after it is enveloped with a wrap material in a manner described below.

A wrapping mechanism 200 for enveloping a bale formed in the bale-forming chamber 44 to a desired diameter is shown mounted to the rear end of the gate 20. Referring now also the FIGS. 2-5, it can be seen that the wrapping mechanism 200 includes a frame 202 including opposite vertical sidewalls 204 provided with forward vertical flanges bolted or otherwise secured to corresponding flanges forming vertical rear ends of the gate sidewalls 22. Tops of the sidewalls 204 are defined by horizontal flanges 206. A wrap material housing 208 has opposite sidewalls 210 joined together by a downwardly and rearwardly sloping top wall 212, a vertical rear wall 214 and a horizontal bottom wall 216 which terminates short of the front of the housing for defining a wrap material passage 217. The front of the housing 208 is closed by a vertical panel 218 extending between and joined to the gate sidewalls 22. Resting on the bottom wall 216 of the housing 208 is a supply roll of wrap material 220 which is biased, by means of a U-shaped structure 222 toward a corner 224 defined by the juncture of a plane containing the bottom wall 216 and the panel 218. The U-shaped structure 222 includes a pair of arms 226 having forward ends respectively pivotally connected to upper forward locations of the sidewalls 210, as at pivots 228, and having rearward ends joined together by a crossbar 230 which engages an upper rear area of the roll of wrap material. A rearwardly projecting arm 232 is mounted to the right pivot 228 for rotation with the arm 226 and a spring 234 is coupled between the arm 232 and the right sidewall 210 so as to urge the crossbar 230 against the roll of wrap material 220. The housing 208 is mounted to the sidewalls 204 by a pair of straps 236 depending from lower rear locations of the sidewalls 210 and respectively coupled to the sidewalls 204 by pivots 238. Thus, the housing 208 may be pivoted rearwardly about the pivots 238 to a lowered open load position, show in dashed lines in FIG. 3, permitting loading of a new roll of wrapping material. It is to be noted that such loading is not only facilitated by the fact that the open position of the housing makes it unnecessary to lift a roll of wrap material a great distance above the ground but also because the biased, U-shaped structure 222 makes it unnecessary to manipulate the roll of wrapping material onto end supports as is the case with known structures.

A pair of spreader roll support legs 240 is secured to and depends from inner front locations of the housing sidewalls 210. Extending between and rotatably mounted to the bottoms of the legs 240 is a wrap material spreader roll 242 comprising a cylindrical roll having spiral flighting (not shown) at opposite ends thereof and with the spirals being of opposite hand for acting on the wrap material to "feed" the opposite edges thereof toward the opposite sidewalls 204. When the housing 208 is in a closed dispensing position, as shown in solid lines in FIG. 3, for example, the spreader roll 242 is disposed for rotation about an axis located forwardly of and below an axis of rotation of a forward drive roll 244 which is rotatably supported in the opposite sidewalls 204. A rear portion of the periphery of the spreader roll 242 is located very close to and slightly beneath a forward portion of the periphery of the drive roll 244. A rear drive roll 246 extends between and has opposite ends rotatably supported by the sidewalls 204 at a location below and rearwardly of the axis of rotation of the front drive roll 244. The drive rolls 244 and 246 include respective elastomeric surfaces which are in tight frictional engagement with each other so as to define a pinch point 256 for gripping wrap material fed therebetween. After a new roll of wrap material 220 has been loaded in the open housing 208, a length 257 of the wrap material is pulled from the roll and placed over the spreader roll 242 and manually fed into the drive rolls 244 and 246. The housing 208 is then closed resulting in the length of wrap material 257 being tightly wrapped about approximately three-fourths of the periphery of the drive roll 244.

Figure 2:
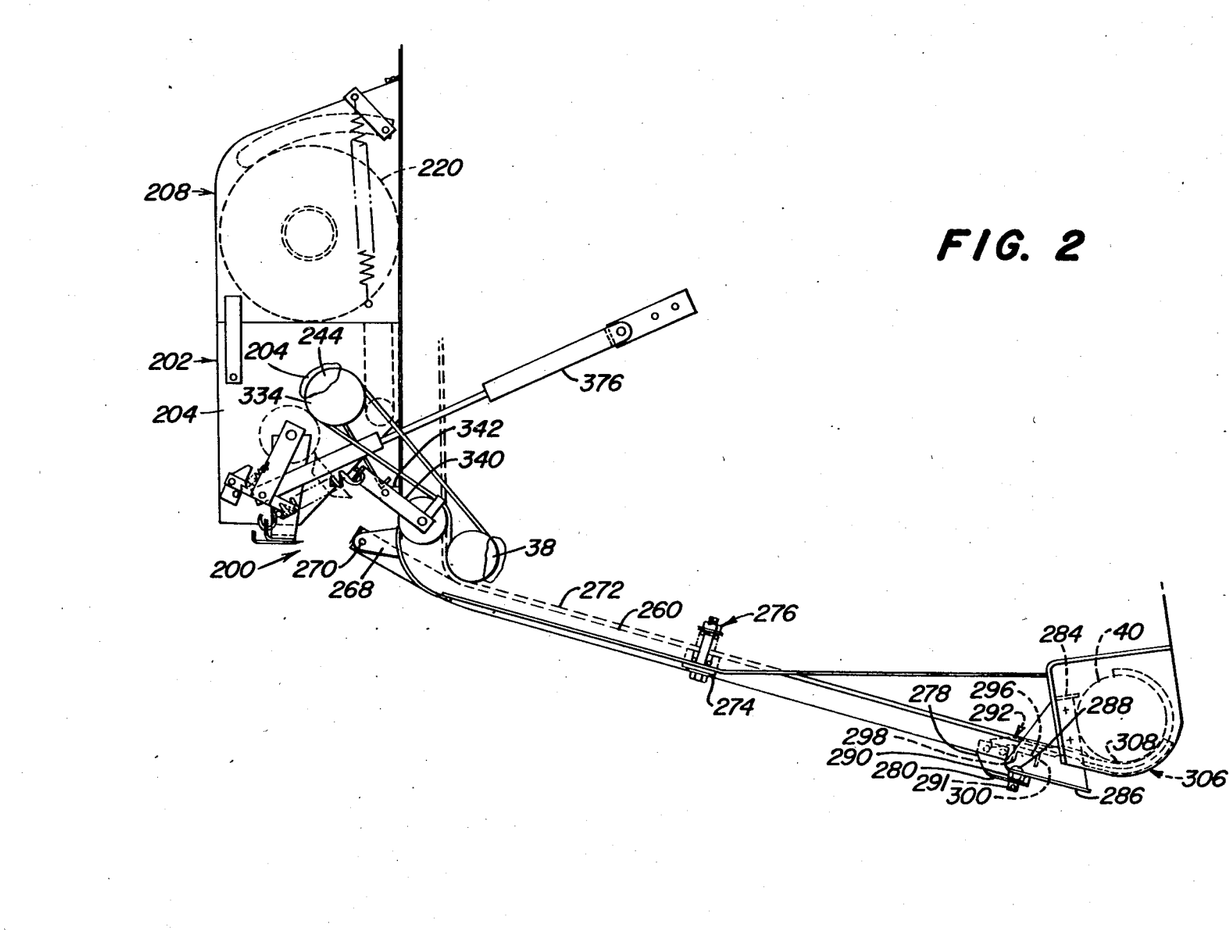
FIG. 2 is an enlarged right side elevational view of the wrapping mechanism shown in FIG. 1.

A wrap material guide pan 258 is provided for guiding wrap material exiting from the drive rolls 244 and 246 toward the bale chamber inlet 46. The guide pan 258 is preferably constructed of a material capable of presenting a low friction surface for guiding the wrap material. Stainless steel and some plastics, for example, exhibit this characteristic. The pan 258 shown here is preferably formed from a rectangular blank of stainless steel sheet material and include a rectangular main section 260 having opposite depending side flanges 262, a front flange (not shown) and a rear flange 266. A pair of brackets 268 project rearwardly from lower rear locations of the sidewalls 22 and are pivotally joined to rear ends of the pan side flanges 262 by a pair of axially aligned pins 270. The main section 260 of the pan has a smooth upper surface engaged with bale-forming belt portions 272 extending between the lower rear and lower front rollers 38 and 40, respectively, carried by the gate 20. Joined to the opposite pan side flanges 262 at locations medially of the front and rear ends of the pan are tabs 274 which project outwardly beneath the opposite gate sidewalls 22. A pair of spring assemblies 276 are coupled between the sidewalls 22 and the tabs 274 and act to bias the pan upwardly about the pivot pins 270 to yieldably hold the section 260 of the pan in engagement with the bale-forming belt portions 272. The forward end of the pan, as best seen in FIG. 2, terminates rearwardly of the roll 40 and respectively coupled to the forward ends of the side flanges 262 are depending brackets 278 having outturned bottom ends 280 extending parallel to the pan upper surface and inturned forward ends (not shown) spaced forwardly of and extending parallel to the pan front flange. A pair of brackets 284 are respectively coupled to the interior of the gate sidewalls 22 at locations just rearwardly of the roll 40 and have respective outturned bottom ends 286 spaced vertically above and extending parallel to the outturned bottom ends 280 of the brackets 78. The bracket bottom ends 280 and 286 at each side of the baler are provided with aligned holes and received in the aligned holes is a bolt 288 secured to the bracket bottom end 286 by a nut 290 located between the lower bracket ends 280 and 286. The bolt 288 has a hole therein located below the bracket ends 280 and containing a cotter pin 291. The distance between the bottom of the nut 290 and the cotter pin 291 is such as to permit the guide pan 258 to pivot downwardly about the pins 270 in the event that stray crop or a foreign object such as a stone finds its way between the pan 258 and the belt portions 272, such pivoting permitting the stray crop or foreign object to move along the pan without seriously inhibiting the progress of or damaging the wrap material.

A guide finger assembly 292 is fixed ahead of the pan 258 for guiding wrap material exiting from the front of the pan around the roll 40 a distance sufficient for the material to be grabbed at a pinch point 294 (FIG. 1) formed by the bale-forming belts 64 and the bale 50. Specifically, the guide finger assembly 292 comprises a downwardly opening, transverse channel member 296 having a web forming a coplanar extension of the upper pan surface, having a rear leg 298 secured to the front pan flange by a plurality of transversely spaced fastener and having a front leg 300 having opposite ends secured to the fronts of the inturned forward ends of the brackets by a pair of fasteners (not shown). Spaced across and welded to the channel member 296 at a location corresponding to gaps (not shown) between the bale-forming belts 64 are a plurality of guide fingers 306 (only one shown) having forward ends 308 curved about a lower portion of the belt support roll 40.

Figure 3:
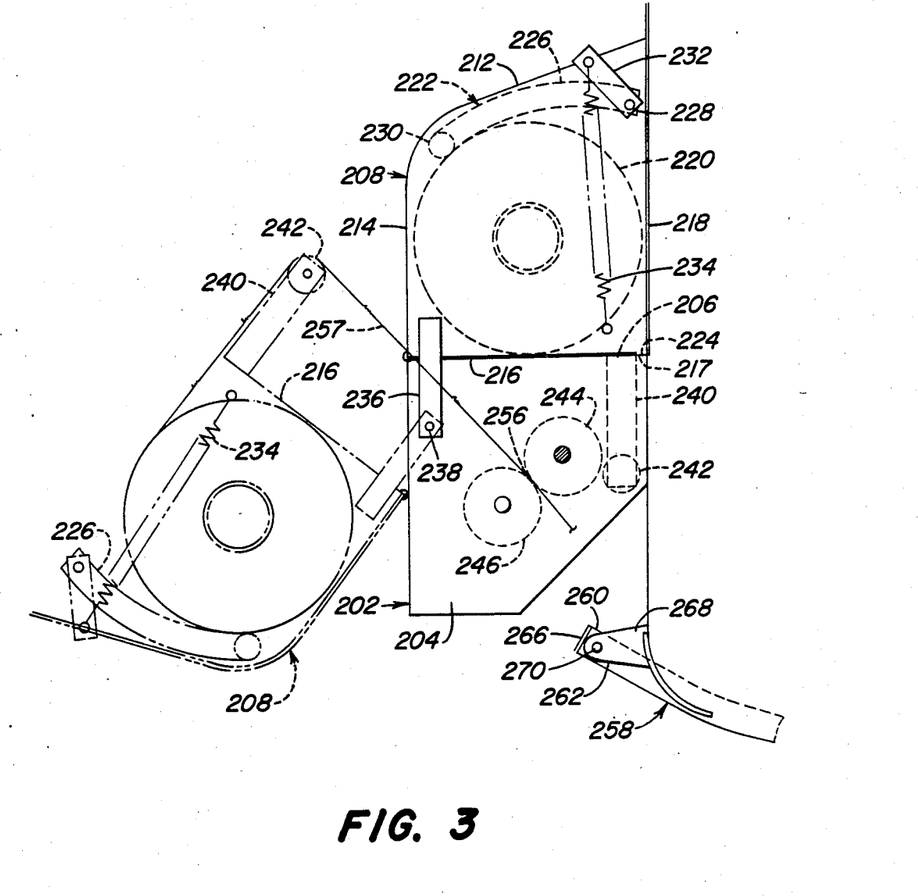
FIG. 3 is a right side elevational view showing the wrap material housing in a solid line closed dispensing position and a dashed line open loading position.

As can best be seen in FIG. 3, that portion of the wrap material guide pan 258 which projects rearwardly beyond the gate 20 includes an upper surface 318 located beneath a flight path F extending tangentially to the drive rolls 244 and 246 and intersecting the pan section 260 approximately at a pinch point 320 defined between the pan and the bale-forming belts 64 where the latter pass around the bale-forming belt support roll 38. Respectively associated with the drive rolls 244 and 246 are sheet metal wrap material guides 322 and 324 which extend between and are secured to the sidewalls 204. The guide 322 includes a flat guide portion 326 extending forwardly from the periphery of the drive roll 24 and is located above and generally parallel to the flight path F. For a purpose explained below, the forward end of the guide 322 is upwardly angled, as at 328. The guide 324 includes a flat guide portion 330 extending forwardly from the periphery of the drive roll 246 in general parallelism to and below the flight path F.

Figure 4:
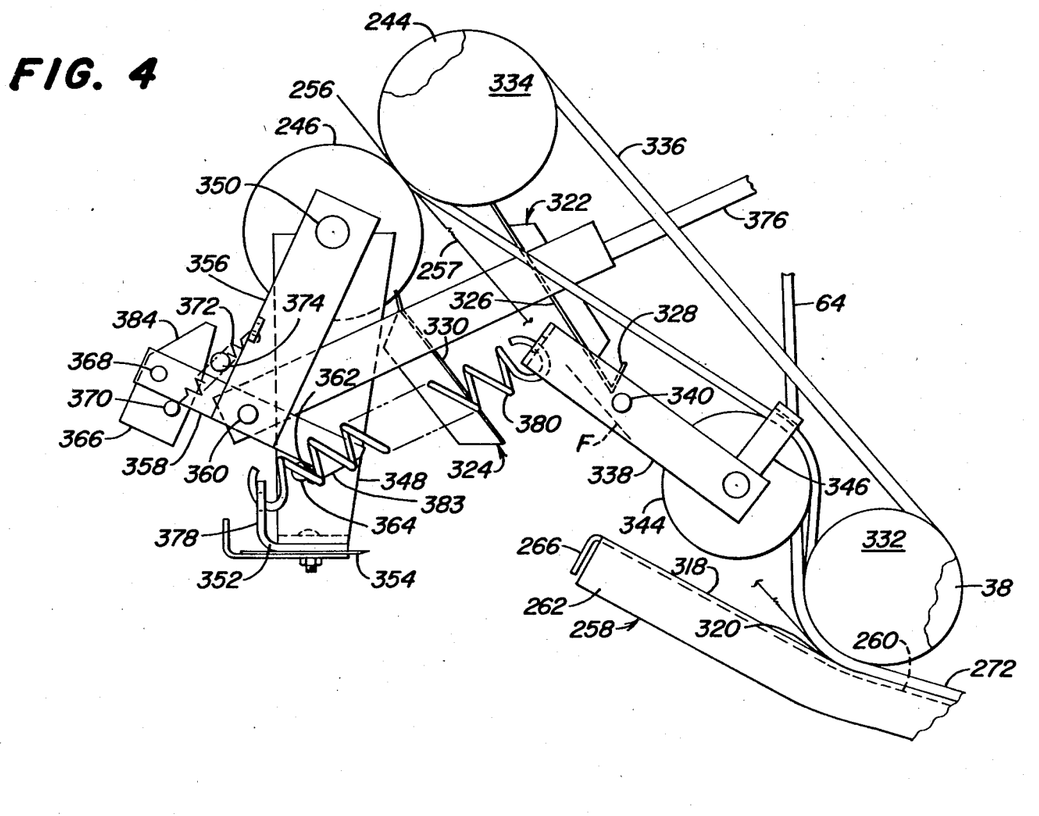
FIG. 4 is a right side elevational view showing the drive mechanism for the drive rolls engaged and the cut off knife support arms cocked.

The drive rolls 244 and 246 are selectively driven by a drive including a drive pulley 332 fixed on a right end extension of a support shaft of the bale-forming belt support roll 38 and a driven pulley 334 fixed on a right end extension of a support shaft of the forward drive roll 244. A drive belt 336 is trained about the pulleys 332 and 334. Located adjacent a lower rear run of the belt 336 is an idler pulley support arm 338 which is mounted, as at a pivot 340, to a bracket 342 (FIG. 2) secured to the rear of the gate right sidewall 22. An idler pulley 344 is rotatably mounted to one end of the arm 338. Fixed to the arm 338 and extending over the pulley 344 and the lower rear run of the belt 336 is a U-shaped belt guide 346. The idler pulley 344 is shown in a drive-establishing position wherein it presses upwardly against the lower run of the belt 336. A pair of wrap cut-off blade support arms 348 are respectively pivotally mounted to axial extensions 350 at the opposite ends of rear drive roll 246. Lower ends of the arm 348 are inturned and secured thereto is a blade or knife support 352 to which is secured a wrap cut-off blade or knife 354. Also pivotally mounted to the right extension 350 is a latch support arm 356 having a strap-like latch element 358 attached thereto by a pivot connection 360. The forward end of the latch element 358 defines a downwardly facing hook surface 362 which is releasably engaged over a latch pin 364 projecting outwardly from the right blade support arm 348. A cam tab 366 is pivotally connected to the rear end of the latch element 358 by a pin 368. A stop pin 370 is fixed to the tab 366 and engages the element 358 for limiting counterclockwise rotation of the tab relative to the element. A spring 372 is coupled between the stop pin 350 and the latch support arm 356 and normally holds the stop pin 370 against the element 358 while at the same time biasing the hook surface 362 against the latch pin 364. A guide or trip pin 372 projects from the right sidewall 204 at a location just ahead of the cam tab 366. An extensible and retractable hydraulic cylinder 376 has its head end coupled to the gate right sidewall 22 and has its rod end coupled to the pivot connection 360 and acts, when extended as shown in FIG. 4, through the latch arms 356 and the latch element 358 to hold the knife support arms 348 in a cocked condition. Coupled between a bracket 378 forming a rightward projection of the blade support 352 and the top of the idler pulley support arm 338 for maintaining the idler pulley 344 in drive establishing engagement with the belt 336 whenever the cylinder 372 is holding the knife support arms in their cocked condition is a coil spring 380. Upon the latch element 358 being released from the latch pin 364 by an initial amount of retraction of the rod of the cylinder 376, the spring 380 acts to swing the blade support arms 348 counterclockwise from their cocked position, shown in FIG. 3, to the wrap cut-off position, shown in FIG. 4, wherein the blade 354 lies adjacent a forward surface of the angled end 328 of the wrap material guide 322. The spring 380 also acts, when moving to its collapsed condition shown in FIG. 4, to cause clockwise movement of the idler pulley support arm 338 and hence the pulley 344 so as to disengage the drive to the drive rolls 244 and 246. This action of the spring 380 also causes the belt 336 to become kinked, as at 382, by the belt guide 346 which acts to brake the rotation of the drive rolls to prevent further feed of the wrapping material once the drive roll drive is disengaged. As the cylinder 376 approaches the end of its retraction stroke, an inclined forward end 383 of the latch element 358 will engage the latch pin 364 and cause the latch element 358 to rock counterclockwise so as to re-engage the hook surface 362 with the pin 364. This retracted condition of the cylinder 376 is that which prevails during formation of a bale within the chamber 44.

Once a bale is formed to a desired diameter in the chamber, an automatic control system (not shown) including a bale size responsive means acts to initiate a bale wrapping cycle by effecting extension of the cylinder 376. As the cylinder 376 extends, it pivots the latch support arm 356 clockwise and since the latch element 358 is engaged with the pin 364, the knife support arm 356 is likewise pivoted clockwise. As the cylinder 372 approaches its fully extended position, an inclined surface 384 at the upper rear of the cam tab 366 engages the guide or trip pin 374 and causes the tab 366 to rotate clockwise until it moves past the pin 374. The knife support arms 348 are then in their cocked condition shown in FIG. 4 and the spring 380 then acts to hold the idler pulley 344 in drive-establishing engagement with the drive belt 336. Because the bale-forming belts 64 are still being driven by the roll 26, the roll 38 and, hence, the drive roll 244 are driven clockwise. This effects counterclockwise rotation of the drive roll 246 and causes the wrap material to be fed toward the guide pan 258. Once the wrap material engages the rear upper surface 318 of the guide pan, it passes into the pinch point 320 defined between the pan surface and the bale-forming belt portions 272. The wrap material is then carried forwardly by the belt portions 272 to the guide fingers 306 which cause the wrap material to pass about the roll 40 into the bale-forming chamber and into the pinch point 294 established between the bale 50 and the belts 64. The wrap material then is pulled into the bale chamber by the action of the belts 64 and the rotating bale 50 and thus becomes wrapped about the periphery of the bale. The peripheral speed of the bale is a preselected percentage greater than the peripheral speed of the drive rolls 244 and 246 whereby the wrap material is placed under tension and is in fact stretched or elongated by this percentage during its application to the bale. The maximum speed difference allowable is somewhat less than that which would cause the wrap material being used to be stretched to its rupture point. Because of the tight frictional engagement of the drive rolls 244 and 246 with each other and the considerable surface contact of the wrap material with the roll 244 as established by the placement of the spreader roll 242, the wrap material is kept from slipping through the drive rolls. Once the bale 50 has received a desired amount of wrapping, the cylinder 376 is retracted. Initial movement of the cylinder 376 results in the cam tab 366 engaging the trip pin 366 and effects release of the latch element 358 from the pin 364. The tensioned spring 380 then acts the swing the knife support arms 348 counterclockwise to bring the blade 354 into contact with the tensioned wrap material and to sweep it against the angled end 328 of the forward wrap material guide 322 which acts to enhance the cutting action of the blade. As the spring 380 unloads, it acts to disengage and brake the drive roll drive. The wrapping cycle of the mechanism 200 is then completed and once the wrap material cut from the roll of wrap material is wrapped upon the bale 50 the gate 20 is opened to discharge the wrapped bale.

Figures 5, 6:
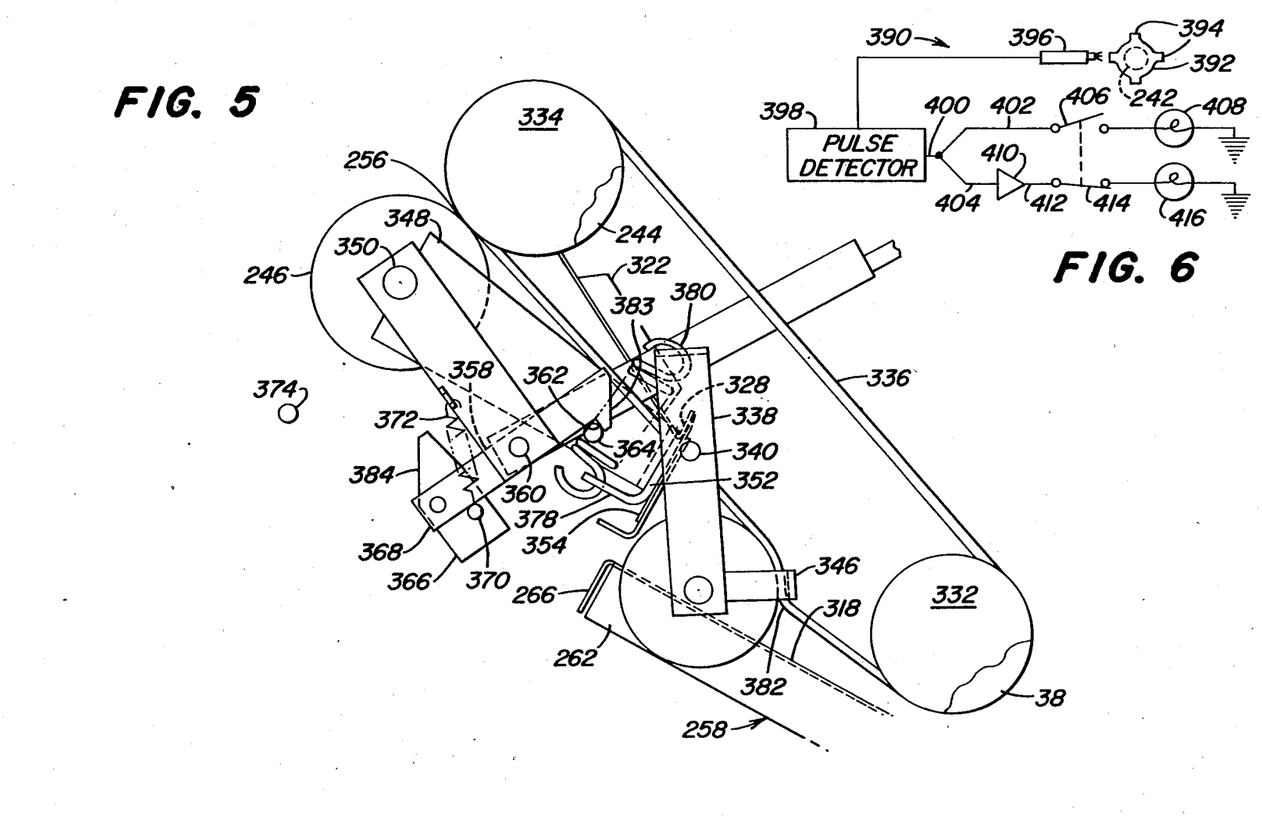
FIG. 5 is a view like FIG. 4 but showing the drive mechanism disengaged and the knife arms released.
FIG. 6 is a schematic view showing an electrical circuit for monitoring when a roll of wrap material becomes depleted or is dispensed when not desired.

Referring now to FIG. 6, there is shown an electrical, wrapping material monitoring circuit 390 which may optionally be embodied in the wrapping mechanism 200 for the purpose of notifying an operator that the roll of wrap material 220 has been depleted or that wrap material is being dispensed when not desired. Specifically, coupled to a right end extension of the spreader roll 242 is a wheel 392 having a plurality of equiangularly spaced teeth 394 located about its periphery. A magnetic sensing head 396 is located adjacent a path swept by the teeth 394. Coupled to the sensing head 396 is a conventional pulse detector circuit 398 which, for example, may be a type including an integrating amplifier having an output level of zero volts when pulses are detected at or above a given threshold frequency and having an output which goes high when no pulses are detected for a period of time below the threshold frequency. A pair of condition indicating circuit lines 402 and 404 are coupled in parallel to the output 400 of the pulse detector circuit 398. The circuit line 402 contains a normally open switch 406 coupled between the pulse detector circuit output 400 and an electrically responsive device here shown as a lamp 408. The circuit line 404 contains an inverting amplifier 410 having an output 412 which is at a level of zero volts whenever the output 400 is high and which goes high whenever the output 400 is at a level of zero volts. A normally closed switch 414 is coupled between the amplifier output 412 and an electrically responsive warning device here shown as a lamp 416. The switches 406 and 414 are interconnected and are operatively associated with the wrap material drive roll drive so as to be respectively simultaneously closed and opened only during the time that the drive rolls 244 and 246 are being driven. For example, the switches may be mechanically linked to an actuator which is engaged by the latch element support arm 356 when the cylinder 376 is fully extended as shown in FIG. 4. Thus, it will be appreciated that during the time when the baler is forming a bale, the cylinder 376 will be contracted and the switches 406 and 414 will respectively be in their normally open and closed positions. With no wrap material being dispensed, the spreader roll 242 will normally be stationary and the output 400 of the detector circuit 398 will be high and thus the output 412 of the amplifier 410 will be zero. However, should the wrap material somehow be advanced through the drive rolls 244 and 246, the roll 242 will rotate causing the output 400 to go to zero and the output 412 to go high to energize the lamp 416. It will also be appreciated that during the time when a bale is being wrapped, the switches 406 and 414 will respectively be closed and open. The drive roll drive will then be engaged to advance wrap material through the drive rolls 244 and 246 and the spreader roll 242 will normally be rotating. The output 400 of the detector circuit 398 will be zero and the lamp 408 will remain unlit. However, should the spreader roll 242 stop rotating as would happen if the supply of wrap were exhausted, the output 400 would go high and energize the lamp 408. While two lamps 408 and 416 are shown, it will be apparent that a single warning device could be used if desired.

We claim:

1. In a large round baler having a bale chamber for receiving crop products and including driven, chamber defining elements for rotating the crop products within the chamber for forming a bale, and a bale wrapping mechanism including a wrap material feeding mechanism for introducing wrap material into the chamber for engagement with the periphery of a bale rotating within the chamber, the improvement, comprising: said wrap material feeding mechanism including a pair of frictionally interengaged drive rolls adapted for having wrap material placed therebetween for being propelled toward the bale-forming chamber; drive means coupled to one of the pair of drive rolls for selectively driving the rolls when wrapping of a bale is desired; a wrap material support roll mounted adjacent the drive rolls at a location for having the wrap material drivingly engage a peripheral portion thereof before passing between the drive rolls whereby the support roll will rotate any time wrap material is advancing through the drive rolls; rotation sensing means operatively associated with the support roll and operable for monitoring the rotation of the support roll and generating first and second output signals respectively indicative of rotation and absence of rotation; at least one indicating circuit means coupled to the rotation sensing means and including signal means responsive to the second signal for notifying an operator when the support roll is not rotating so as to indicate an exhaustion of wrap material; and said one indicating circuit means including enabling means operatively associated with the drive means for enabling the rotation sensing means only when the drive means is driving the drive rolls.

2. In a large round baler having a bale chamber for receiving crop products and including driven, chamber defining elements for rotating the crop products within the chamber for forming a bale, and a bale wrapping mechanism including a wrap material feeding mechanism for introducing wrap material into the chamber for engagement with the periphery of a bale rotating within the chamber, the improvement, comprising: said wrap material feeding mechanism including a pair of frictionally interengaged drive rolls adapted for having wrap material placed therebetween for being propelled toward the bale-forming chamber; drive means coupled to one of the pair of drive rolls for selectively driving the rolls when wrapping of a bale is desired; a wrap material support roll mounted adjacent the drive rolls at a location for having the wrap material drivingly engage a peripheral portion thereof before passing between the drive rolls whereby the support roll will rotate any time wrap material is advancing through the drive rolls; rotation sensing means operatively associated with the support roll and operable for monitoring the rotation of the support roll and generating first and second output signals respectively indicative of rotation and absence of rotation; at least one indicating circuit means coupled to the rotation sensing means and including signal means responsive to the first signal for notifying an operator when the support roll is rotating so as to indicate undesired dispensing of wrap material; and said one indicating circuit means including enabling means operatively associated with the drive means for enabling the rotation sensing means only when the drive means is not driving the drive rolls.

3. The large round baler defined in claim 2 and further including a second indicating circuit means including signal means responsive to the second signal for notifying an operator when the support roll is not rotating so as to indicate exhaustion of wrap material; and said second indicating circuit means including enabling means for enabling the second indicating circuit means only when the drive means is driving the drive rolls.

* * * * *